United States Patent
Barve et al.

(10) Patent No.: US 12,124,404 B2
(45) Date of Patent: *Oct. 22, 2024

(54) METHOD OF AND SYSTEM FOR ENHANCED LOCAL-DEVICE CONTENT DISCOVERY

(71) Applicant: Veveo LLC, San Jose, CA (US)

(72) Inventors: Rakesh Barve, Bangalore (IN); Sashikumar Venkataraman, Andover, MA (US); Pankaj Garg, Patiala (IN); Ganesh Ramamoorthy, Andover, MA (US); Kajamalai G. Ramakrishnan, Nashua, NH (US); Murali Aravamudan, Andover, MA (US)

(73) Assignee: Veveo LLC, San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/668,605

(22) Filed: Feb. 10, 2022

(65) Prior Publication Data
US 2022/0237145 A1    Jul. 28, 2022

Related U.S. Application Data

(63) Continuation of application No. 15/615,661, filed on Jun. 6, 2017, now Pat. No. 11,281,620, which is a continuation of application No. 13/019,465, filed on Feb. 2, 2011, now Pat. No. 9,703,779.

(60) Provisional application No. 61/301,307, filed on Feb. 4, 2010.

(51) Int. Cl.
G06F 16/00    (2019.01)
G06F 16/33    (2019.01)
G06F 16/332    (2019.01)

(52) U.S. Cl.
CPC ............ *G06F 16/00* (2019.01); *G06F 16/332* (2019.01); *G06F 16/3331* (2019.01)

(58) Field of Classification Search
CPC .............. G06F 17/30; G06F 17/30637; G06F 17/30657; G06F 16/00
USPC ........................................................ 707/713
See application file for complete search history.

(56) References Cited

U.S. PATENT DOCUMENTS

| 7,512,620 B2 * | 3/2009 | Dingle |
| 2005/0165777 A1 | 7/2005 | Hurst-Hiller et al. |
| 2006/0064411 A1 * | 3/2006 | Gross et al. ...................... 707/3 |
| 2006/0074883 A1 * | 4/2006 | Teevan ................ G06F 16/9535 |

(Continued)

*Primary Examiner* — Syling Yen
(74) *Attorney, Agent, or Firm* — Lerner David LLP

(57) ABSTRACT

A method of and system for enhanced local-device content discovery is disclosed. A method includes providing a local collection of content items and associated metacontent on a device. The metacontent describes the informational content of the corresponding content items. A remote catalog of metacontent items and information describing relationships between the metacontent items is provided. Input is received from the user for finding at least one desired content item and a search query is formed including at least one metacontent item of the remote catalog based on matching the input from the user with metacontent items of the catalog and further based on the information describing relationships between the metacontent items. A subset of content items of the local collection associated with metacontent that at least partially matches the search query is selected and presented on a display device based on at least one ranking criterion.

20 Claims, 5 Drawing Sheets

(56) References Cited

U.S. PATENT DOCUMENTS

| | | |
|---|---|---|
| 2006/0287995 A1* | 12/2006 | Quince .............................. 707/5 |
| 2007/0016570 A1 | 1/2007 | Punaganti et al. |
| 2007/0027852 A1 | 2/2007 | Howard et al. |
| 2007/0027866 A1 | 2/2007 | Schmidt-Karaca |
| 2007/0192318 A1 | 8/2007 | Ramer et al. |
| 2007/0198496 A1 | 8/2007 | Loftus et al. |
| 2007/0226242 A1 | 9/2007 | Wang et al. |
| 2007/0271205 A1* | 11/2007 | Aravamudan ...... G06F 16/2453 707/E17.06 |
| 2008/0040474 A1 | 2/2008 | Zuckerberg et al. |
| 2008/0243828 A1* | 10/2008 | Reztlaff et al. ................... 707/5 |
| 2009/0175561 A1* | 7/2009 | Lankswert .................... 382/305 |
| 2009/0307105 A1* | 12/2009 | Lemay et al. ................... 705/26 |
| 2010/0094835 A1* | 4/2010 | Lu ......................... G06F 16/951 707/E17.143 |
| 2010/0299343 A1* | 11/2010 | Ahari et al. ................. 707/759 |
| 2010/0305848 A1 | 12/2010 | Stallman |
| 2010/0306191 A1* | 12/2010 | LeBeau ............ G06F 16/24578 707/723 |
| 2010/0325153 A1* | 12/2010 | Thakkar et al. .............. 707/770 |
| 2011/0131235 A1 | 6/2011 | Petrou et al. |
| 2012/0030186 A1 | 2/2012 | Joshi |
| 2012/0166925 A1 | 6/2012 | Boerries et al. |

\* cited by examiner

METHOD OF AND SYSTEM FOR ENHANCED LOCAL-DEVICE CONTENT DISCOVERY

CROSS-REFERENCE TO RELATED APPLICATIONS

This application is a continuation of U.S. patent application Ser. No. 15/615,661, filed Jun. 6, 2017, which is a continuation of U.S. patent application Ser. No. 13/019,465, filed Feb. 2, 2011, now U.S. Pat. No. 9,703,779, which claims the benefit under 35 U.S.C. § 119(e) to U.S. Provisional Patent Application No. 61/301,307, entitled Method of and System for Enhanced Content Discovely Based on Network and Device Access Behavior, filed on Feb. 4, 2010, the contents of which are incorporated by reference herein in their entirety.

This application is related to the following U.S. patent applications, filed on an even date herewith:
U.S. patent application Ser. No. 13/019,461, entitled Method of and System for Enhanced Content Discovery Based on Network and Device Access Behavior, and
U.S. patent application Ser. No. 13/019,467, entitled Method of and System for Updating Locally Cached Content Description Information.

BACKGROUND OF THE INVENTION

Field of the Invention

The invention generally relates to identifying and presenting content to a user in response to a search action, and, more specifically, to combining global preference and metacontent information with individualized preference information gathered by a user device.

Description of Related Art

On-device information retrieval systems permit a user to search, browse or shuffle through items located in databases on and off of the device. For example, a cache of items may be stored on the device, with more items stored in databases in various servers on the Internet/network, to which the device is connected. The device may be, for example, a phone, personal music device (e.g., iPod, mp3 players), a set top box, a mapping or GPS device, a gaming device or even a personal computer.

Examples of items located in databases resident on the device include, but are not limited to, contact information, music related items (songs, artists, albums, playlists), videos, images, DVR'd programs, local region-specific maps and local listings, applications from appstores of various kinds, bookmarks of browsers, etc. With the growth in volatile and especially non-volatile memory on devices, local databases are increasing in size as well as diversity.

On one hand, meaningful portions of otherwise large databases, usually stored only in the network, may be explicitly carved out by a service provider and cached on the device itself, in order to facilitate mission critical information retrieval, even in the face of data network failures. For instance, the entire Boston region maps/directions database and local listings of a Boston based subscriber may be cached on his/her device (phone or GPS) so that a minimal set of search queries work even when the data network is congested or unavailable. On the other hand, the on-device non-volatile memory is also a natural choice to store the databases pertaining to the user's music collection (from a music store or from a CD or MP3 collection), applications downloaded from an application store, bookmarks of the device browser being used by the user, contact information being used in communication applications used by a device-user, TV programs or other videos DVR'd, downloaded or purchased by the user, images or photos that are on the device and so on.

Examples of items from databases resident on network-based servers that can possibly be returned in response to search, browse or shuffle queries originating in on-device information retrieval systems include, but are not limited to, contact information and listings of businesses, map and listings databases, videos, songs, album and artist listings, applications databases, images and photos, and indeed arbitrary collections of items, textual or multimedia, including web-pages that can be presented to the user of the device. There can be a multiplicity of servers in the Internet or network connected to the device which may serve requests and send back items of various types back to the device.

There are two distinct possibilities pertaining to the nature of the results presented in response to search browse, or shuffle queries from such on-device information retrieval systems. In the first possibility, the results are restricted to items from databases resident on the device. In the second possibility, the results are a mix of items, some from databases resident on the device and some from databases requested on a multiplicity of servers in the Internet or network to which the device is connected. A boundary case of this scenario, for example in a search operation, is when there are no local results for a user input, and the results are all from the network. One example of the boundary case of this scenario for a browse operation is when the entire contents or part of the browse hierarchy itself comes from the network.

BRIEF SUMMARY OF THE INVENTION

A method of and system for enhanced local-device content discovery is disclosed.

In accordance with one embodiment of the invention, a method includes providing on a local device a local collection of content items and associated metacontent. The metacontent associated with each content item describes the informational content of the corresponding content item. The method also includes providing on a remote server system a remote catalog of metacontent items and information describing relationships between the metacontent items. The method further includes receiving input from the user for finding at least one desired content item and forming a search query including at least one metacontent item of the catalog of metacontent items based on matching the input from the user with metacontent items of the catalog and further based on the information describing relationships between the metacontent items. The method includes determining a subset of content items of the local collection associated with metacontent that at least partially matches the search query and presenting the subset of content items of the local collection on a display device based on at least one ranking criterion.

In accordance with another embodiment of the invention, the remote catalog of metacontent further includes metacontent associated with content items.

In accordance with yet another embodiment of the invention, the method also includes providing access to a collection of content items and associated metacontent remote from the local device. The metacontent associated with each content item describes the informational content of the corresponding content item. The method also includes determining a subset of content items of the remote collection of content items associated with metacontent that at least partially matches the search query. The method further includes merging the subset of content items of the remote collection with the subset of content items of the local collection for presentation on the display device based on the at least one ranking criterion.

In accordance with a further embodiment of the invention, the method also includes maintaining a remote inventory of the content items of the local collection remote from the local device. Optionally, the determination of the subset of content items of the local collection associated with metacontent that at least partially matches the search query is performed relative to the remote inventory of the content items of the local collection.

In accordance with still another embodiment of the invention, the method includes, responsive to the selection of one of the content items of the subset, passing at least a portion of the search query as an input to the selected content item.

DETAILED DESCRIPTION

Figure 1:
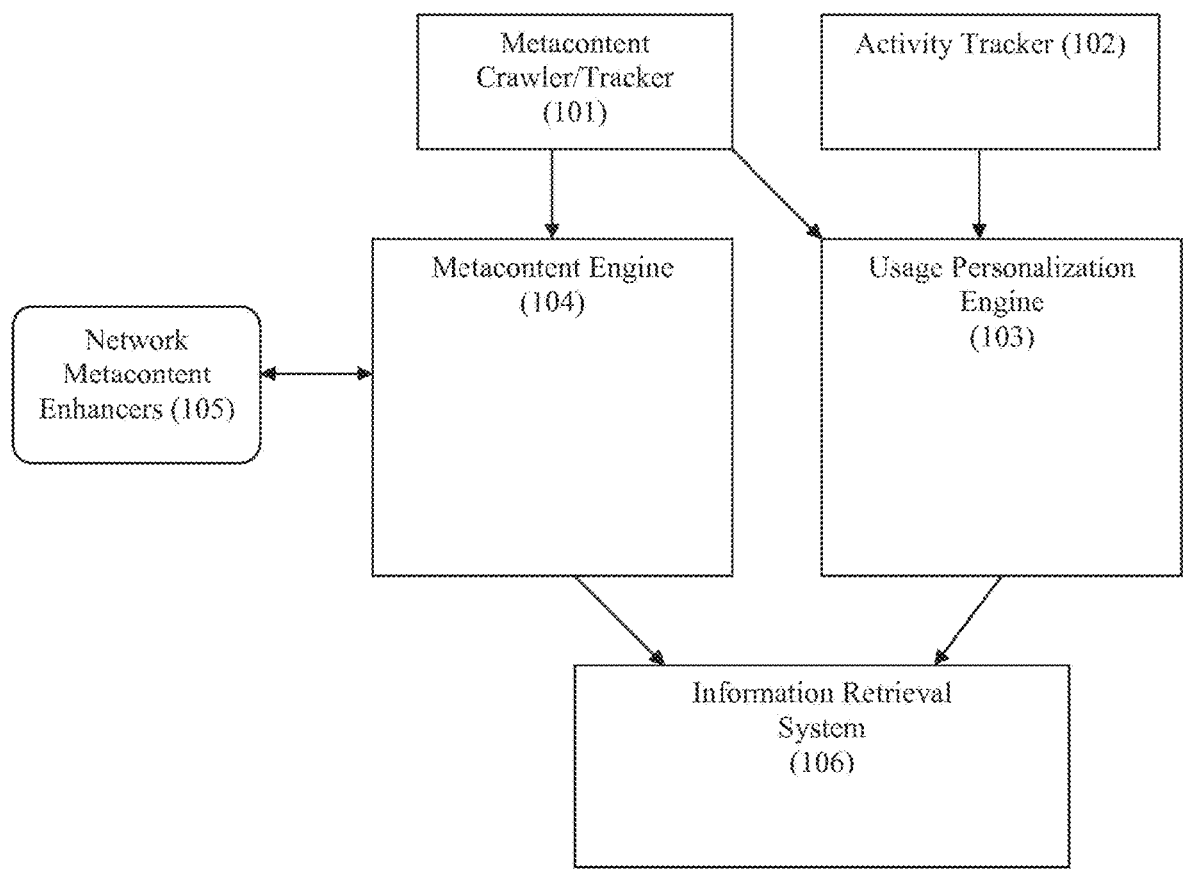
FIG. 1 illustrates an overview of the architecture of a system according to an embodiment of the invention.

Disclosed herein is a method and system to combine network based global information about content items with locally-cached preference information. For example, the global information can include content item relevance, popularity, and text metacontent. Whereas the locally-cached information ("local information" herein) present on the user's device can include personalized relevance, personal user preferences, and usage patterns. Doing so enables an improved ordering of results presented to the device user in response to a content search action. The disclosed techniques can be applied to the results regardless of whether the results come only from a local database on the device, a combination of a local database and a remote database (e.g., an Internet-based search engine), or the remote database only. Regardless of the user operation of search/browse/shuffle, the network response can be personalized to the user based on the previous learned user content access behavior on the device.

Certain embodiments of the invention build on techniques, systems and methods disclosed in U.S. patent application Ser. No. 11/136,261, entitled Method And System For Performing Searches For Television Content Using Reduced Text Input, filed on May 24, 2005, U.S. patent application Ser. No. 11/235,928, entitled Method And System For Processing Ambiguous, Multiterm Search Queries, filed on Sep. 27, 2005, now U.S. Pat. No. 7,788,266, U.S. patent application Ser. No. 11/682,693, entitled Methods And Systems For Selecting And Presenting Content Based On Learned Periodicity Of User Content Selections, filed on Mar. 6, 2007, now U.S. Pat. No. 7,774,294, U.S. patent application Ser. No. 11/939,086, entitled Method Of And System For Selecting And Presenting Content Based On User Identification, filed on Nov. 17, 2007, all of which are incorporated by reference herein and included in the attached appendix. The present techniques, however, are not limited to systems and methods disclosed in the incorporated patents and applications. Thus, while reference to such systems and applications may be helpful, it is not believed necessary to understand the present embodiments or inventions. For example, the incorporated applications describe methods of learning user content preferences, processing user incremental query input, and employing user viewing habits to discover relevant content. As described in greater detail below, these techniques can be used in combination with those presented herein.

In one embodiment of the invention, a query database is associated with each possible result of a search, browse, or shuffle query. Thus, such a query database contains associations between result items and one or more queries made by users, in response to which a user acted upon the particular result. Optionally, certain personalized item attributes and certain global item attributes can be associated with each possible result. Examples of personalized and global attributes are described below. Furthermore, certain personalized dataspace attributes can be associated with each dataspace in the set of all possible dataspaces.

In another embodiment of the invention, a dataspace is associated with any result item, and a dataspace can be defined in terms of the following two attributes: a dataspace type and a dataspace origin flag. Dataspace type, denoted Type herein, describes the type of content items resident in the dataspace. Examples of dataspace types include, but are not limited to, contact information, music/song, music/artist, music/album, televisions program, mobile application, webpage/bookmark, webpage, video, photograph, on-device utility, on-device file, on-device directory/folder, local region map information, yellow page listing, white page listing, game etc. Other taxonomies of dataspace types can also be used; the one mentioned above is only indicative. Dataspace origin flag, denoted Origin herein, indicates the source of the database. Examples include, but are not limited to, On-Device database and Network database.

In one illustrative implementation, the personalized item attributes associated with any result item may include one or more of a personalized item-relevance or other personalized attributes. Personalized item-relevance, denoted P-Relevance herein, can a scaled integer or real number directly proportional to the relevance of that item relative to the database of all items in the same dataspace as that item, for the device's user and each specific search, browse or shuffle query. Other attributes, denoted P-Other Attributes, can include personal periodicity of usage, frequency of usage, duration of usage/interaction, raw count of usage, last time of usage, temporal characteristics of usage, and/or location characteristics of usage. Other attributes are within the scope of the invention. Theses attributes can be independent of any queries associated with items, and, rather, be simply associated with the items themselves based upon learning the users' interactions with the items.

The techniques set forth in U.S. Pat. No. 7,774,294 can be used to learn the various attributes. As described in that patent, each time a user interacts with a particular item, the user's preference that is tracked for that item is increased. Similarly, preference tracking values associated with metacontent associated with the item can be increased. For example, if the item viewed by the user is a clip of a Red Sox baseball game, preference values associated with video clips, Red Sox, and baseball can all be increased. Furthermore, the weighting factors associated with any of the attributes described herein can be scaled integers, real numbers, and/or vector quantities, depending on the type of user interaction information collected. Thus, if a user has a variable pattern of interaction with an item, a set of items, or a particular dataspace during the day, this pattern can be captured in a vector representing user preferences during timeslots throughout the day (the same can be done for location of interaction). For example, a user may exhibit a high degree of interaction with audio/video items during the morning commute, very little to none during the workday, and a high degree of interaction during the evening commute. Such an activity pattern can be learned and captured in a vector quantity. Also as described in the incorporated patent, the attribute weights can be decayed over time.

In one embodiment of the invention, the global item attributes associated with any result item may include one or more of a global item-relevance or other global attributes. Global item-relevance, denoted G-Relevance herein, can be a scaled integer or real number directly proportional to the relevance of that item relative to the database of all items in the same dataspace as that item, across all possible users and for each specific search, browse or shuffle query. Other attributes, denoted G-Other Attributes, can include a global periodicity of usage, global frequency of usage, average duration of usage/interaction, raw count of usage, last time of usage, global temporal characteristics of usage, and/or global location characteristics of usage. Other attributes are within the scope of the invention. Theses attributes can be independent of any queries associated with items, and, rather, be simply associated with the items themselves based upon learning the users' interactions with the items across the entire system or a portion thereof.

As set forth above in connection with the personalized attributes, the techniques set forth in U.S. Pat. No. 7,774,294 can be used to determine the various attributes and magnitudes of those attributes to be associated with the items, sets of items, and/or dataspaces. However, in the case of global attributes, the actions and interactivity of a plurality of users (in some cases, all) are monitored to determine the proper values.

In one embodiment of the invention, the personalized dataspace attributes associated with a dataspace may include one or more of a personalized dataspace relevance, or other personalized database attributes. Personalized dataspace relevance, denoted PD-Relevance herein, can be scaled integer or real number directly proportional to the relevance of that dataspace for the device's user and each specific search, browse or shuffle query. Other personalized dataspace related attributes, denoted PD-Other Attributes, can include personal periodicity of usage of a dataspace, frequency of usage of a dataspace, duration of usage/interaction of a dataspace, raw count of usage of a dataspace, last time of usage of a dataspace, temporal characteristics of usage of a dataspace, and/or location characteristics of usage of a dataspace. Other attributes are within the scope of the invention.

Personalized dataspace attributes concern the dataspace itself rather than the particular items belonging the dataspace. Thus, while attribute values are determined and/or modified for an item based on a user's interaction behavior with that item, separate values associated with the dataspace to which the item belongs are also determined and/or modified. For example, when a user plays a number of songs on her device, one implementation of the invention will increase the individual personal preference attributes associated with each individual song. In addition, personalized dataspace attribute values will be increased in the aggregate for the music dataspace for each individual song played. Moreover, if the user merely interacts with the dataspace (e.g., search and/or browse), but does not select content from the dataspace, this, too, can be captured by the techniques set forth herein.

Embodiments of the invention described herein enable the global dataspace attributes, personalized item attributes, global item attributes, and the personalized dataspace attributes associated with each item-result candidate to be considered together and combined in suitable ways in order to determine and present an improved ordering of results in response to a search, browse, or shuffle query performed on a user device. The relevance values and attributes can be treated as metacontent, as described in more detail below. As used herein, the terms device, user device, local device, and Smartphone are used interchangeable and can include any one of a PDA, tablet-style computing device, Smartphone, mobile phone, or other handheld computing device. Any of the embodiments or implementations of the invention can also be implemented on a personal computer or via a web-based interface to a on-line application.

FIG. 1 illustrates the on-device architecture in one possible embodiment of the invention. An on-device metacontent crawler and tracker (101) continuously keeps track of all locally resident content items and their associated metacontent, including updates, etc. An activity tracker (102) keeps track of all the user's activities, including, but not limited to, specific usage patterns and actions on on-device items, as well as certain items from network databases. For example, a remote network database (e.g., search engine) may send a set of results in response to user queries for such things as restaurants, websites, sports teams, places of interest, etc. If a particular user frequently acts upon some specific subset of restaurants, websites, sports teams, and/or places of interest, the listings corresponding to the specific subset of restaurants, websites, sports teams, and/or places of interest etc. are stored and indexed on that user's device. At any subsequent time, the particular subset of network listings stored and indexed on the device may change based on the user's "current" preferences, i.e., the subset of network items on the device may age-decay and change over time.

A personalization engine (103) consumes activity information that has been captured by the activity tracker (102) and maintains information (including, e.g., information from crawler tracker (101)) to compute the current personalized item attributes for all items on-device, as well as any on-device queued items, as described above. The personalization engine (103) also maintains information to determine the current personalized dataspace attributes for each dataspace corresponding to items from local and network databases.

A Metacontent Engine (104) maintains a metacontent database that includes metacontent associated with content items and dataspaces and other global information that can be used to compute global item attributes (e.g., G-Relevance, G-Other attributes, etc.). The metacontent that is associated with content items and dataspaces depends on the type of items and dataspaces in question. Examples follow. A contacts dataspace can have the following associated metacontent: name, email address, company, telephone number, and physical address. An audio/video item (e.g., music) dataspace can have the following associated metacontent: song name, artist name, album name, and musical genre. A bookmarks or websites dataspace can have the following associated metacontent: the URL, domain name, page title, and category. An "apps store" dataspace can have the following associated metacontent: Application name, keywords, price, and categories. A point of interest dataspace can have the following associated metacontent: name of listing, physical address, geographic location (e.g., latitude and longitude). A text communication dataspace (e.g., for SMS, email, IM) can have the following associated metacontent: subject (if applicable), text content, sender identifier, and receiver identifiers.

The Metacontent Engine (104) augments and enhances global information, including global popularity and relevance for local items, by incorporating information from Network Metacontent Enhancers (105) from time-to-time. Network Metacontent Enhancers (105) serve as a source of metacontent related to content items of various data types. This information can be gathered from a variety of online sources of information, such as websites, authoritative databases, user contributed websites, curated or editorially created content databases, operator-controlled content walled-gardens, etc. Certain implementations of the present invention can be used with the systems and techniques disclosed in U.S. patent application Ser. No. 12/879,141, entitled "Method of and System For Presenting Enriched Video Viewing Analytics", filed on Sep. 10, 2010, incorporated by reference herein. That application describes analytics associated with audio/video content items, and, more specifically, to providing statistical and analytical information on past, present, and predicted future viewing and user-interaction operations as well as providing a structured metacontent system for content items. Thus, the various server elements described in that application can serve as Network Metacontent Enhancers for use with embodiments of the present invention.

Thus, the Metacontent Engine (104) has information that can be used to determine global item attributes for each local item. An on-device Information Retrieval System (106) can, optionally, communicate with the Metacontent Engine (104) and Usage Personalization Engine (103) to retrieve and combine global item attributes, personalized item attributes, and dataspace attributes for each item in a result set from any search/browse/shuffle query originating on the device. The items in the result set could be from a device-resident database or a network-resident database.

The elements described in FIG. 1 can be implemented in one or many computer systems, including individual server machines. The elements of the computer systems can be connect via a network, which can be public and/or private, wired and/or wireless. Thus, "network" as used herein includes the paths used to communicated between elements of the system disclosed herein as well as paths connected outside of the system.

Figure 2:
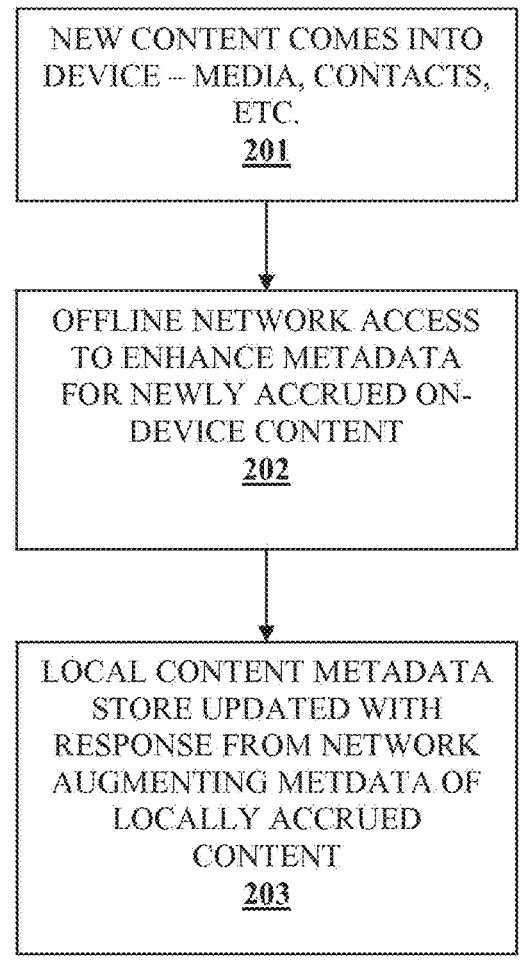
FIG. 2 illustrates a process for augmenting metacontent associated with content accrued on a user device.

FIG. 2 illustrates the offline processing steps for augmenting the metacontent associated with on-device accrued content. Content such as media, contacts, etc. continue to accrue on device (201). In response, from time-to-time, a Metacontent Engine (104) on the device connects to a Network Metacontent Enhancer (105) via a network link and correlates the content that has locally accrued with content present on the Network Metacontent Enhancer. For example, suppose an application that was downloaded onto the device from an application store. Locally obtained information about the application (e.g., file name, MP3 tags for a song, URL or other text information pertaining to a bookmark, application name, and/or appstore name) is sent to the Network Metacontent Enhancer (105) or one of a multiplicity of network based metacontent servers. The Network Metacontent Enhancer (105) matches the locally obtained information using various techniques with meaningful items in its database. Whenever a match is possible, the Network Metacontent Enhancer (105) returns additional information, such as global popularity measures of appropriate kinds.

For example, the Network Metacontent Enhancer (105) matches an MP3 file with file-name "beatlesheyjude" (note: often MP3 tags are often not well formed name-value pairs) with the database records for the track name "Hey Jude" of artist "The Beatles" from a music listings database. Based upon the match the Network Metacontent Enhancer (105) returns the current song's popularity figure on a scale of 1000 and/or the current artist popularity figure for the artist associated with the song. Similarly, additional textual metacontent may be sent back to the device, e.g., the artist "Beatles" and song title "Hey Jude" may be associated with the file "beatlesheyjude".

Another example follows: based on an application name and application store identity, the Network Metacontent Enhancer (105) identifies one or more records pertaining to a database of all applications corresponding to that application store, and/or a figure indicative of the current number of downloads for the application. Yet another example is correlating a bookmark URL to database records pertaining to a website having a name that matches or is similar to the URL in a website metacontent database. For web content, the Network Metacontent Enhancer (105) returns a figure indicative of current page-rank and/or some other web popularity number for a webpage. Likewise, the categories for an application or web site, etc. can be associated with the corresponding content. By doing this, the system enhances the metacontent of locally accrued content (203).

Figure 3:
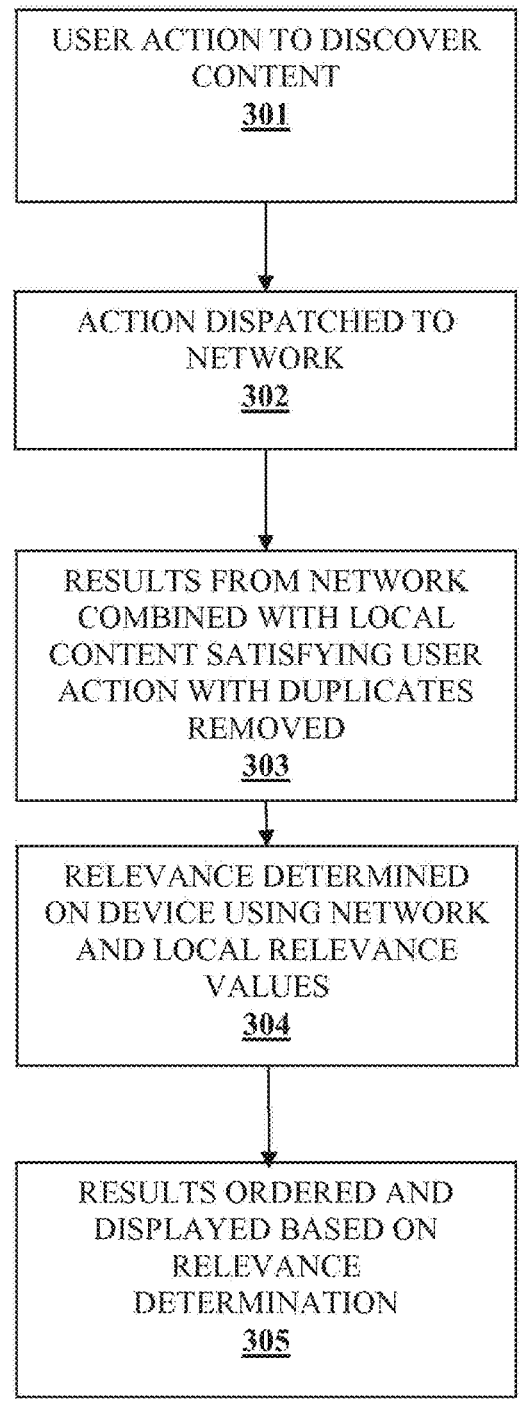
FIG. 3 illustrates a process for displaying content in response to a user search action.

FIG. 3 illustrates the steps involved in displaying the results of a user action (search, browse, shuffle) according to an illustrative implementation of the invention. When user attempts to discover content (301) (e.g., via search, browser, or other action), the user action is dispatched to the network (302) (e.g., an Internet-based search engine or database). In the case of a text search, characters constituting the query can be dispatched as the user is typing (i.e., incremental searching). In the case of a browse action, additional results may be requested from the network when the user navigates into a browse node hierarchy. The results from the network are then fetched, and they are displayed (303) along with the locally present results, removing duplicate results. This duplicate item removal process is facilitated by the augmented metacontent that is already present on the device that resulted from the offline enhancement of on-device metacontent process described above. For example, if two items have metacontent that match within a certain threshold, the system considers the two items to be identical.

For example, the only metacontent initially available on-device for a music track could be the file nametag created by user, such as "ninth_symphony.mp3". This sparse metacontent could have been enhanced by the offline processing, described above, by correlating it with Beethoven's Ninth Symphony as found on a network element. Thus, the metacontent "Beethoven" is associated with the locally resident music track. Therefore, when user types "beeth" as an incremental query on the local device, the system will return this item as a result item because of the match in query input and metacontent. Likewise, other content items associated with the word "Beethoven" will be returned, e.g., other symphonies by Beethoven, a link to the 1992 movie "Beethoven", and/or web articles about the composer. The system will also begin the process of combining network resident results along with locally resident results by removing duplicates. Thus, the device may only present the locally resident copy of Beethoven's Ninth Symphony in response to the query instead of both the local copy and network resident copy.

Next, the likely relevance of each of the content items of the result set is determined using the personalized attributes and global attribute values described above (304). In so doing, any one or more of these attributes are combined (e.g., using a weighted sum of any applicable relevance or attribute values) to determine an overall relative relevance of the content item to the user's query. For example, because the Ninth Symphony music track is locally resident on the device, in some implementations, it will get a relevance boost. Likewise, the user's prior access frequency of the music track will be taken into account in determining overall relevance. Further still, other parameters, such as, global dataspace attributes, personalized dataspace attributes, other global item attributes, and/or other personalized item attributes are taken into account to decide the final ordering of results tailored to the user. Finally, the results are ordered and presented on the device based on the overall relevance determination (305).

The presence of locally resident metacontent combined with access and usage history offers the potential for significant enhancement to the user experience by leveraging the user's prior device usage to determine personalized content. This personalized content display allows for a user's preferences to outweigh, in appropriate contexts, global relevance for certain items. At the same time, it also enables the network global relevance to have an impact on results display when meaningful. For example, even if the user has only infrequently played a particular song, if there is a major news event on that artist, a result pertaining to that artist may have a strong temporal boost from the network when the user is searching for or browsing content given the item will have relatively high global relevance and global attribute values.

In contrast, personalized relevance and personalized attributes may outweigh global relevance and global attributes. For example, assume a music group A is globally much more popular than music group B (i.e., group B may be considered a "longtail" band). In addition, assume both bands are searchable using the same search term(s). If a particular user has a much higher personalized relevance for group B then an on-device search may be more likely to rank items associated with group B more highly than group A even though group A is globally more popular. This is because group B is more relevant for that particular user than group A. The same principle can extend to other types of items and other dataspaces. As a second example, assume user 1 tends to do searches in the contacts, email, and website dataspace from his Smartphone, whereas user 2 primarily searches the contacts, music, and applications dataspace from his Smartphone. In this example, even if the two users have absolutely identical content on the device, as well as access to the same content on remote network sources, the same query from user 1 and user 2 may return different results for user 1 than for user 2 reflecting their personalized dataspace relevance values. A similar result could occur if, in response to a dataspace-independent search, user 1 typically selected items belonging to the contacts, email, and website dataspaces, while user 1 typically selected items belonging to the contacts, music, and applications dataspaces.

Embodiments of the present invention, leverages the user's on-device actions to influence and personalize the display of results by combining on-device learning with the global network-based relevance of items. This device-centric approach while maintaining the network's global relevance for items and dataspaces, enhances user experience by offering a more relevant and pertinent ordering, from the user's perspective, in content discovery operations. Moreover, by storing the user's preference information and history of usage (i.e., the user's "signature") on the device and not on the network, a user's concerns for privacy are reduced. In situations where network results have to be personalized to the user's signature, the pruning and reordering can happen on the device.

In another implementation, the user's signature could be sent anonymously to facilitate personalized results generation on the server, but the signature is not saved on the server. Each content request/search could be accompanied by the signature to enable the server to generate a personalized response. Having the user signature resident on the device also has the advantage of selectively requesting servers catering to specific dataspaces of interest to the user. For example, a user may be interested in only a certain dataspace though its global relevance may not be high. The user signature however, can dictate that the network server catering to the dataspace of interest to the user is contacted as opposed to a globally popular dataspace.

Systems and techniques for using metacontent present on servers and databases that are remote from a user to improve search, browse, and shuffle queries on such devices (e.g., Smartphone) have been disclosed above. The use of the Network Metacontent Enhancers to analyze the on-device metacontent of an item and supplement that metacontent with additional metacontent (e.g., keywords, terms, and categories) in order to improve the searchability of that item is performed at least once, and more typically, performed from time-to-time. However, supplementing the metacontent on the device is typically done independent of user queries. In contrast, the use of numerical and statistical weights denoting the personalized and global relevance values for an item, or for an item in the context of a specific query, to present a personalized and meaningful ordering of search results is linked directly to the query activity.

Figure 4:
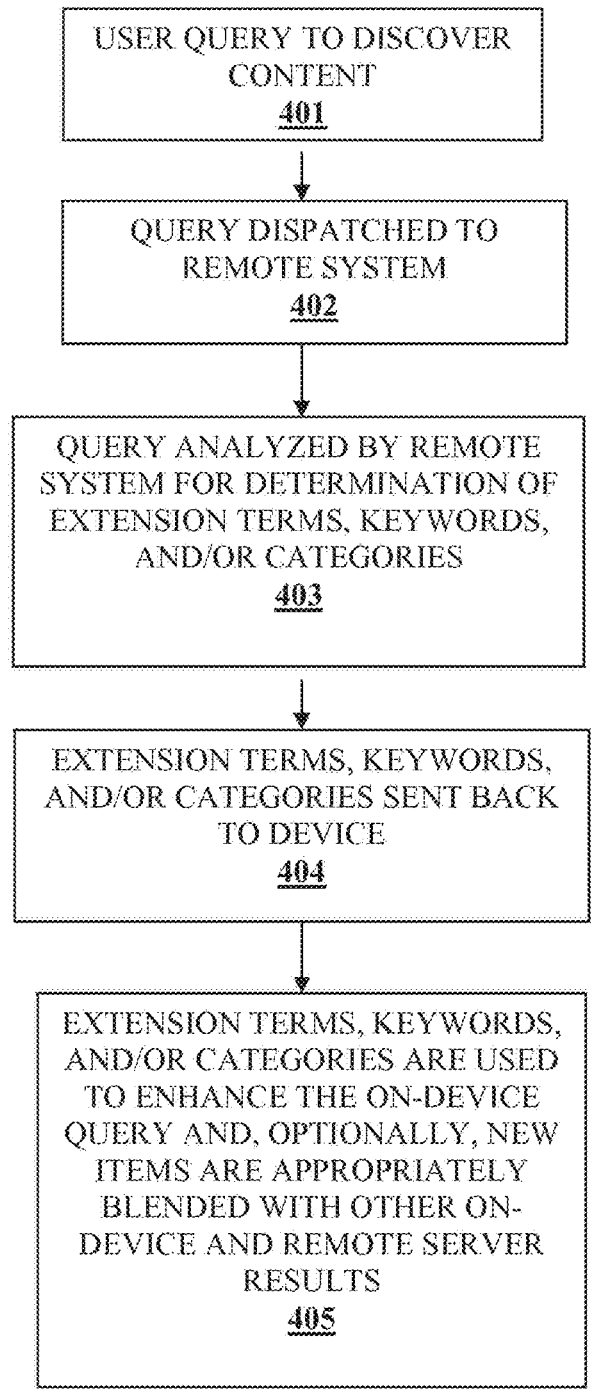
FIG. 4 illustrates a process for query analysis and query extension in an on-device search.

In some implementations of the invention, the enhancement of a query is performed dynamically (i.e., at the time of the query) by using metacontent on remote servers and/or databases to discover content on the local device that otherwise may not have been returned as a query result. FIG. 4 illustrates a process for query analysis and query extension in an on-device search. In such a process, a user enters a query to discover content resident on a local device and, optionally, from a remote server source (401). The query is sent to a remote system (402), where the query is analyzed is greater detail than may be practical on the local device due to limited memory and/or computational abilities of the device. The remote system may include or work in conjunction with one or more of the Usage Personalization Engine (103), Metacontent Engine (104), Network Metacontent Enhancers (105), and/or Information Retrieval System (106), described above. As such, implementations of the invention provide both associations between content and their corresponding metacontent as well as associations between metacontent alone, independent of underlying content. The query analysis may, e.g., involve performing a semantic analysis of the user's query, so as to extend the user's original query by determining terms, categories, keywords, and/or other information (extension information) that can be used to discover content on the local device that would have gone undiscovered using the original query alone (403). For example, additional information that is commonly associated with similar queries by other users can be returned. Such associations can be discovered through global user query tracking using, for example, any of the components shown and described above.

The extension terms, keywords, categories, and/or other information are sent back to the user's device (404). This extension information is then used by the on-device processing engine(s) to retrieve additional on-device items that would not have been retrieved without the query extension information (405). Optionally, any remote server-based results and/or global relevance or other global attribute information can be sent back to the local device with the extension information. Any new result items that are found on the local device can then be blended with other on-device query results and/or query results that originated from remote server sources.

The following example illustrates one implementation of the above-described techniques. Assume a user has on his device an application called "Yelp!", which may have been associated with, among other textual strings, the text string "restaurant guide". Because of on-device resource limitations, the number of strings that can be associated with the application is limited. Moreover, when the Yelp! Application is loaded onto the device, it may only be associated with a limited numbers of descriptor keywords. As a result, even though the Yelp! on-device application, which can be an effective restaurant-locator, is arguably a very good on-device query result for numerous queries containing terms such as "Vietnamese", "Moroccan cuisine", "Mediterranean", "pho", "quiche", and/or "moussaka", that application will never be retrieved by an on-device search engine using those keywords because those keywords are not associated with the Yelp! application on the local device. However, as mentioned above, it may be impractical to associate all of the possible keywords with the application because the number of terms is likely to be so large, and often so dynamic, that periodically enhancing the local metacontent associated with the Yelp! application will be ineffective of problematic.

Implementations of the invention make possible the presentation of the Yelp! application, or other on-device restaurant-finding applications, as query result items for queries containing terms such as those described above. Specifically, runtime query analysis is performed on the query terms submitted by the user on the network servers in order to compute additional possible keywords that are related to the ones submitted by the user but not present in the on-device index. Thus, in response to the user query "Mediterranean", an on-device search using this query only would not discover the Yelp! application. However, in response to having the keyword "Mediterranean" submitted to the network servers, the related keywords or categories such as "restaurant", "restaurant locator", etc. are determined and sent back to the local device as query extension information. Upon receiving these query extension terms, the on-device search engine discovers the application Yelp!, which was associated with the category "restaurants" and/or "restaurant-locator" on the local device.

Another illustrative example of how the network-side query-extensions process (FIG. 4) can improve the user's experience involves a user query "big papi trade". The remote server query-analysis extends this query to include terms such as "mlb", "baseball", "Red Sox", "ESPN", and/or "Manny Ramirez" These extensions are then be used to discover relevant on-device applications (and/or content) that would otherwise not be presented to the user. Further still, is a query "MSFT quarterly results", which could produce query extensions of "finance", "business news", etc. The on-device query could then discover on-device results such as the Bloomberg Application, if present.

In another illustrative implementation of the invention, the network-side query extension process can be used to perform query extensions before the user's query is completely entered. For example, the remote servers may provide for a partial query string "mediterr" (a prefix of "Mediterranean") the extension terms of "restaurant" and/or "restaurant-locator" if the remote server(s) analyzing the partial entry sufficiently disambiguated. Similarly the query entry "MSFT" may be enough information for the remote server(s) to extend the query with the keywords or categories "Business news", "finance", etc. even before the user has entered additional terms in the search query "MSFT quarterly results". Further still, the network-side query-analyzer system can perform query extensions even when the query entered by the user has typographical, lexicographic, and/or phonetic errors. Thus, even if the queries entered by the user contain errors, e.g., "Big poppy trade", "mussaakaa", or "msft quatery result", the network-side query-analyzer system can correct these queries and return relevant extensions to the local device. The techniques disclosed herein enable content items resident on the local devices to be easily discovered on handheld computing devices with overloaded and/or especially small input keypads. The techniques also increase the ease with which on-device items can be found using text input keypads that are inconvenient to use and/or when the user-query is a speech to text converted query.

In still further implementations of the invention, some or all of the metacontent of at least a subset of the user's on-device content items (including on-device identifiers for those items) is synchronized, or backed-up, to a network servers. In such an implementation, the remote network servers perform not only the query analyses and extensions determination, as described above, but they also carryout a network-side search of the user's backed-up device metacontent. Such a process is illustrated in FIG. 5.

Figure 5:
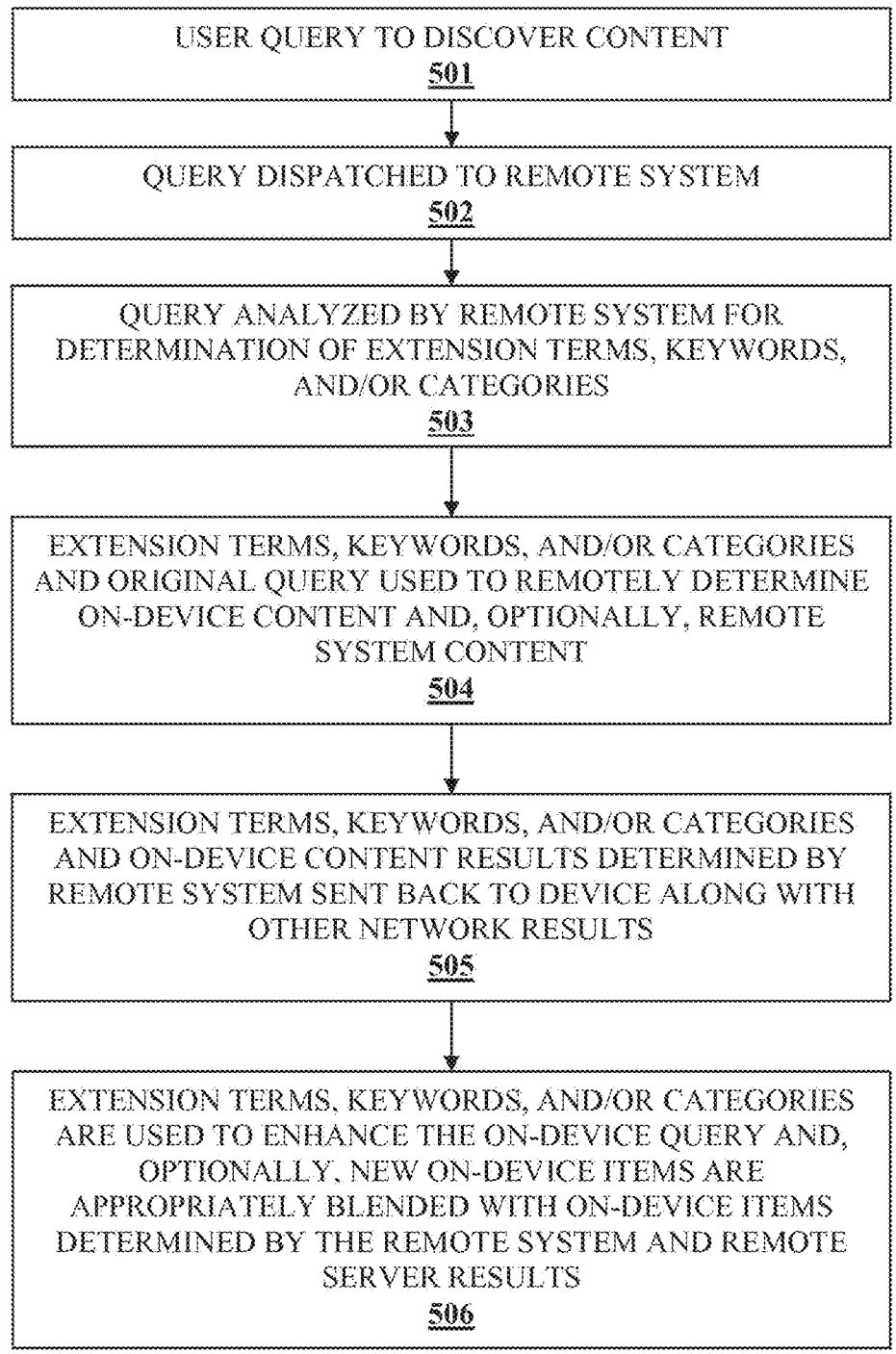
FIG. 5 illustrates a process for query analysis and query extension using remote server-based computation of device results.

As shown in FIG. 5, a user enters a query to discover content (501). The query is sent to a remote system (502), where the query is analyzed is greater detail for the determination of extension information, as described above (503). The extension information and original query terms are then used to determine matching content items that satisfy the extended query (504). Remote servers perform this query against the backed-up set of on-device metacontent and, optionally, against content in the remote system.

The extension terms, keywords, categories, and/or other information are sent back to the user's device along with identifiers associated with the on-device results determined by the remote system (505). Optionally, any remote server-based results and/or global relevance or other global attribute information can be sent back to the local device with the extension information. The extension information is then used by the on-device processing engine(s) to retrieve additional on-device items for which had not been included in the remote server system backup (506). Any new on-device result items that are found on the local device can then be blended with on-device query results discovered by the remote system as well as query results that originated from remote server sources (506).

Building on the Yelp! application example above, assume the Yelp! application is resident on the user's device, and metacontent associated with on-device content (such as the Yelp! application) is backed-up on a remote server system. In such a case, the remote system can return the on-device Yelp! application as an on-device result. In some implementations, the search result interface can present the Yelp! application result as a clickable link to launch the on-device application. Furthermore, certain items provide support for "deep-linking" such that the act of launching the on-device item (e.g., application or website) also provides all or part of the user's query that caused the particular item to be presented to the user as input to the item itself.

In certain implementations of the invention, all or part of the query extension information is provided to the item selected by the user (assuming the item supports deep-linking). For example, if a particular search result item is a web URL, e.g., gmail.com, upon the user selecting the items, a browser application is launched with the deep-link criterion "gmail.com" so that the browser directly opens that URL. Similarly, when the Yelp! application is returned as a result item through the use of query extension information based on "mediterr", as described above, selecting the item will cause the system to launch the Yelp! application with the keyword "Mediterranean". This can result is directly displaying results of interest to the user without the additional steps of completing a query in the Yelp! application. This deep-linking aspect can be used with any of the embodiments and/or implementations described herein.

The techniques and systems disclosed herein may be implemented as a computer program product for use with a computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

As described above, the techniques and methods disclosed herein enable an improved user experience for conducting search/discovery operations on a user device. Such devices include, but are not limited to, mobile telephones, personal digital assistants, tablet computers, television remote control/set-top-box systems, and other portable computing systems. Likewise, aspects of the various embodiments of the invention can be used with personal computer systems, whether of the portable or desktop variety. In all such devices, any of the tangible media and/or memory devices described above can be incorporated.

It will be appreciated that the scope of the present invention is not limited to the above-described embodiments, but rather is defined by the appended claims, and these claims will encompass modifications of and improvements to what has been described. For example, the embodiments provided above are described as being useful for performing searches using incremental and/or ambiguous text input. However, the techniques, methods, and systems described and incorporated herein can be implemented on user devices having a full keyboard and/or other input methods permitting full text queries.

What is claimed is:

1. A method of finding and presenting content items based on input received from a user in which the search query used to match content items of potential interest is formed based on matching the input with a catalog of metacontent items and information describing relationships between the metacontent items, the method comprising:

providing on a local device a local collection of content items and associated metacontent stored on the local device, the metacontent associated with each content item describing the informational content of the corresponding content item;

providing on a remote server system a remote catalog of metacontent items and information describing relationships between the metacontent items;

receiving input from the user for finding at least one desired content item;

selecting an extension term for a search query based on information about the user's activities and usage patterns with the local collection of content items stored on the local device;

adding the extension term to the search query including at least one metacontent item of the catalog of metacontent items;

determining a subset of content items of the local collection associated with metacontent that at least partially matches the search query; and presenting the subset of content items of the local collection on a display device based on at least one ranking criterion, wherein the at least one ranking criterion is determined based on previously learned user behaviors and a degree of interaction with the content items captured in a vector, wherein the vector represents user preferences during timeslots throughout the day or the user preferences for location of the interaction.

2. The method of claim 1, wherein the remote catalog of metacontent further includes metacontent associated with content items.

3. The method of claim 1, wherein the content items of the local collection include contact information records and the associated metacontent includes at least one of contact name, contact email address, contact company name, contact telephone number, and contact physical address.

4. The method of claim 1, wherein the content items of the local collection include audio/video items and the associated metacontent includes at least one of song name, song artist name, song album name, audio/video genre, video clip name, and actors featured in the audio/video item.

5. The method of claim 1, wherein the content items of the local collection include website links and the associated metacontent includes at least one of a URL address, domain name of the website link, website page title, and website category.

6. The method of claim 1, wherein the content items of the local collection include application store items and the associated metacontent includes at least one of application name, keywords associated with the application, application price, and application categories.

7. The method of claim 1, wherein the content items of the local collection include point of interest items and the associated metacontent includes at least one of name of point of interest, physical address of the point of interest, geographic location of the point of interest.

8. The method of claim 1, wherein the content items of the local collection include text-based communication records and the associated metacontent includes at least one of subject field, text content of the communication, communication sender identifier, and communication receiver identifiers.

9. The method of claim 1, wherein the ranking criterion includes learned preferences of the user for content items of the local collection and local attribute values associated with the content items of the local collection, each local attribute value being based on interactions of the user with at least one content item of the local collection corresponding to the local attribute value.

10. The method of claim 9, wherein the local attribute values include at least one of a periodicity of usage by the user, frequency of usage by the user, a duration of usage by the user, a number of interactions by the user, a last time of use by the user, temporal information associated with usage by the user, and location information associated with usage by the user.

11. The method of claim 9, wherein the ranking criterion includes learned preferences of a plurality of users for content items of the local collection and global attribute values associated with the content items of the local collection, each global attribute value being based on interactions of a plurality of users with at least one content item of the local collection corresponding to the global attribute value.

12. The method of claim 11, wherein the global attribute values include at least one of a periodicity of usage by the plurality of users, frequency of usage by the plurality of users, a duration of usage by the plurality of users, a number of interactions by the plurality of users, a last time of use by the plurality of users, temporal information associated with usage by the plurality of users, and location information associated with usage by the plurality of users.

13. The method of claim 1, wherein the local device is one of a personal digital assistant, a Smartphone, and a tablet computer.

14. The method of claim 1, wherein the determination of the subset of content items on the local device is determined as each character of the input is entered by the user.

15. The method of claim 1, further comprising:
providing access to a collection of content items and associated metacontent remote from the local device, the metacontent associated with each content item describing the informational content of the corresponding content item
determining a subset of content items of the remote collection of content items associated with metacontent that at least partially matches the search query;
merging the subset of content items of the remote collection with the subset of content items of the local collection for presentation on the display device based on the at least one ranking criterion.

16. The method of claim 1, further comprising maintaining a remote inventory of the content items of the local collection remote from the local device, wherein the determination of the subset of content items of the local collection associated with metacontent that at least partially matches the search query is performed relative to the remote inventory of the content items of the local collection.

17. The method of claim 1, further comprising, responsive to the selection of one of the content items of the subset, passing at least a portion of the search query as an input to the selected content item.

18. A system for finding and presenting content items based on input received from a user in which the search query used to match content items of potential interest is formed based on matching the input with a catalog of metacontent items and information describing relationships between the metacontent items, the system comprising:
memory; and
hardware processing circuitry configured to:
provide on a local device a local collection of content items and associated metacontent stored on the local device, the metacontent associated with each content item describing the informational content of the corresponding content item;
provide on a remote server system a remote catalog of metacontent items and information describing relationships between the metacontent items;
receive input from the user for finding at least one desired content item;
selecting an extension term for a search query based on information about the user's activities and usage patterns with the local collection of content items stored on the local device;
adding the extension term to the search query including at least one metacontent item of the catalog of metacontent items;
determine a subset of content items of the local collection associated with metacontent that at least partially matches the search query; and
present the subset of content items of the local collection on a display device based on at least one ranking criterion, wherein the at least one ranking criterion is determined based on previously learned user behaviors and a degree of interaction with the content items captured in a vector, wherein the vector represents user preferences during timeslots throughout the day or the user preferences for location of the interaction.

19. The system of 18, wherein the hardware processing circuitry is further configured to:
provide access to a collection of content items and associated metacontent remote from the local device, the metacontent associated with each content item describing the informational content of the corresponding content item;
determine a subset of content items of the remote collection of content items associated with metacontent that at least partially matches the search query; and
merge the subset of content items of the remote collection with the subset of content items of the local collection for presentation on the display device based on the at least one ranking criterion.

20. A non-transitory computer-readable medium for storing a plurality of instructions for searching for content items, the plurality of instructions comprising:
an instruction for providing on a local device a local collection of content items and associated metacontent stored on the local device, the metacontent associated with each content item describing the informational content of the corresponding content item;

an instruction for providing on a remote server system a remote catalog of metacontent items and information describing relationships between the metacontent items;

an instruction for receiving input from the user for finding at least one desired content item;

an instruction for selecting an extension term for a search query based on information about the user's activities and usage patterns with the local collection of content items stored on the local device;

an instruction for adding the extension term to the search query including at least one metacontent item of the catalog of metacontent items;

an instruction for determining a subset of content items of the local collection associated with metacontent that at least partially matches the search query; and an instruction for presenting the subset of content items of the local collection on a display device based on at least one ranking criterion, wherein the at least one ranking criterion is determined based on previously learned user behaviors and a degree of interaction with the content items, captured in a vector, wherein the vector represents user preferences during timeslots throughout the day or the user preferences for location of the interaction.

* * * * *